United States Patent
Qian

(10) Patent No.: US 11,231,639 B2
(45) Date of Patent: *Jan. 25, 2022

(54) MOTORIZED CAMERA MOBILE DEVICE STAND FOR PANORAMA AND VIRTUAL REALITY APPLICATIONS

(71) Applicant: Hangzhou Taruo Information Technology Ltd. Corp, Hangzhou (CN)

(72) Inventor: Hao Qian, Hangzhou (CN)

(73) Assignee: HANGZHOU TARUO INFORMATION TECHNOLOGY LTD. CORP, Hangzhou (CN)

(*) Notice: Subject to any disclaimer, the term of this patent is extended or adjusted under 35 U.S.C. 154(b) by 814 days.

This patent is subject to a terminal disclaimer.

(21) Appl. No.: 16/067,793

(22) PCT Filed: May 5, 2017

(86) PCT No.: PCT/CN2017/083346
§ 371 (c)(1),
(2) Date: Jul. 2, 2018

(87) PCT Pub. No.: WO2018/201493
PCT Pub. Date: Nov. 8, 2018

(65) Prior Publication Data
US 2021/0208488 A1    Jul. 8, 2021

(51) Int. Cl.
*G03B 17/56* (2021.01)
*G03B 37/02* (2021.01)
(Continued)

(52) U.S. Cl.
CPC ......... *G03B 17/561* (2013.01); *F16M 11/041* (2013.01); *F16M 11/10* (2013.01);
(Continued)

(58) Field of Classification Search
CPC .. G03B 17/561; G03B 37/02; H04N 5/23299; F16M 11/06; F16M 11/10
See application file for complete search history.

(56) References Cited

U.S. PATENT DOCUMENTS

| | | |
|---|---|---|
| 5,073,824 A | 12/1991 | Vertin |
| 2016/0073021 A1 | 3/2016 | Chang et al. |
| 2018/0065187 A1* | 3/2018 | Yamamoto ............ H01L 21/682 |

OTHER PUBLICATIONS

International Search Report issued in PCT/CN2017/083346 dated Feb. 9, 2018 (5 pages).

(Continued)

*Primary Examiner* — Minh Q Phan
(74) *Attorney, Agent, or Firm* — Osha Bergman Watanabe & Burton LLP

(57) ABSTRACT

A motorized camera mobile device stand that includes a motorized component and an alignment component. The motorized component is configured to receive a command signal from a camera mobile device, and place, in response to the command signal, the camera mobile device in multiple positions for capturing images. The positions include multiple rotation angles with respect to a rotation axis and multiple tilting angles with respect to a tilting axis. The alignment component is configured to substantially align, prior to receiving the command signal and based on a laser beam, the rotation axis with a camera lens of the camera mobile device, substantially align, prior to receive the command signal and based on the laser beam, the tilting axis with the camera lens, and constrain the camera mobile device such that the camera lens substantially overlaps an intersection of the rotation axis and the tilting axis in each position.

33 Claims, 7 Drawing Sheets

(51) Int. Cl.
*F16M 11/04* (2006.01)
*F16M 11/10* (2006.01)
*F16M 11/18* (2006.01)
*H04N 5/232* (2006.01)
*F16M 11/20* (2006.01)

(52) U.S. Cl.
CPC ......... *F16M 11/18* (2013.01); *F16M 11/2014* (2013.01); *G03B 37/02* (2013.01); *H04N 5/23238* (2013.01); *H04N 5/23299* (2018.08); *F16M 2200/08* (2013.01)

(56) References Cited

OTHER PUBLICATIONS

Written Opinion of the International Searching Authority issued in PCT/CN2017/083346 dated Feb. 14, 2018 (4 pages).

\* cited by examiner

MOTORIZED CAMERA MOBILE DEVICE STAND FOR PANORAMA AND VIRTUAL REALITY APPLICATIONS

BACKGROUND

A camera mobile device is a mobile device with a camera for taking photographs and/or video recordings. A dedicated camera with communication capability is an example of the camera mobile device. A mobile phone with a built-in camera, referred to as a camera phone, is another example of the camera mobile device. Many camera phones have a fixed-focus lens and a smaller sensor than a dedicated camera. A camera phone, such as a smart phone, may have a display with graphical user interface that occupy a large portion (e.g., 70% or larger) of the front surface. The camera lens is typically on the back surface of the camera phone, but may also have an additional camera lens on the front surface.

A panorama is a wide angle representation (e.g., wide angle view) of a physical space in photography or other media. Image stitching or photo stitching is the process of combining multiple photographic images with overlapping fields of view to produce a panorama.

SUMMARY

In general, in one aspect, the invention relates to a motorized camera mobile device stand that includes a motorized component and an alignment component. The motorized component is configured to receive a command signal from a camera mobile device, and place, in response to the command signal, the camera mobile device in multiple positions for capturing images. The positions include multiple rotation angles with respect to a rotation axis and multiple tilting angles with respect to a tilting axis. The alignment component is configured to substantially align, prior to receiving the command signal and based on a laser beam, the rotation axis with a camera lens of the camera mobile device, substantially align, prior to receiving the command signal and based on the laser beam, the tilting axis with the camera lens, and constrain the camera mobile device such that the camera lens substantially overlaps an intersection of the rotation axis and the tilting axis in each position.

In general, in one aspect, the invention relates to a method for generating a panorama. The method includes substantially aligning, based on a laser beam of a motorized camera mobile device stand, a rotation axis of the motorized camera mobile device stand with a camera lens of a camera mobile device, substantially aligning, based on the laser beam, a tilting axis of the motorized camera mobile device stand with the camera lens, receiving, by the motorized camera mobile device stand, a command signal from the camera mobile device, placing, by the motorized camera mobile device stand in response to the command signal, the camera mobile device in a number of positions for capturing images of the panorama, and constraining, by the motorized camera mobile device stand, the camera mobile device such that the camera lens substantially overlaps an intersection of the rotation axis and the tilting axis in each of the positions, where the positions include multiple rotation angles with respect to the rotation axis and multiple tilting angles with respect to the tilting axis, where the rotation axis intersects the tilting axis.

In general, in one aspect, the invention relates to a method for generating a panorama. The method includes sending, by a camera mobile device, a command signal to a motorized camera mobile device stand to place the camera mobile device in a number of positions, where the positions include multiple rotation angles with respect to a rotation axis of the motorized camera mobile device stand and multiple tilting angles with respect to a tilting axis of the motorized camera mobile device stand, capturing, using a camera lens of the camera mobile device at each of the positions, one of the images of the panorama, and exchanging, with the motorized camera mobile device stand by the camera mobile device at each of the positions, communication signals to synchronize the capturing of images and the placing the camera mobile device in the multiple positions, where the command signal causes the motorized camera mobile device stand to constrain the camera mobile device such that the camera lens substantially overlaps, in each of the positions, an intersection of the rotation axis and the tilting axis.

In general, in one aspect, the invention relates to a non-transitory computer readable medium storing instructions for generating a panorama. The instructions, when executed by a computer processor, including functionality for substantially aligning, based on a laser beam of a motorized camera mobile device stand, a rotation axis of the motorized camera mobile device stand with a camera lens of a camera mobile device, substantially aligning, based on the laser beam, a tilting axis of the motorized camera mobile device stand with the camera lens, receiving, by the motorized camera mobile device stand, a command signal from the camera mobile device, placing, by the motorized camera mobile device stand in response to the command signal, the camera mobile device in a number of positions for capturing images of the panorama, and constraining, by the motorized camera mobile device stand, the camera mobile device such that the camera lens substantially overlaps an intersection of the rotation axis and the tilting axis in each of the positions, where the positions include multiple rotation angles with respect to the rotation axis and multiple tilting angles with respect to the tilting axis, where the rotation axis intersects the tilting axis.

In general, in one aspect, the invention relates to a non-transitory computer readable medium storing instructions for generating a panorama. The instructions, when executed by a computer processor, including functionality for sending, by a camera mobile device, a command signal to a motorized camera mobile device stand to place the camera mobile device in a number of positions, where the positions include multiple rotation angles with respect to a rotation axis of the motorized camera mobile device stand and multiple tilting angles with respect to a tilting axis of the motorized camera mobile device stand, capturing, using a camera lens of the camera mobile device at each of the positions, one of the images of the panorama, and exchanging, with the motorized camera mobile device stand by the camera mobile device at each of the positions, communication signals to synchronize the capturing of images and the placing the camera mobile device in the multiple positions, where the command signal causes the motorized camera mobile device stand to constrain the camera mobile device such that the camera lens substantially overlaps, in each of the positions, an intersection of the rotation axis and the tilting axis.

Other aspects of the invention will be apparent from the following description and the appended claims.

DETAILED DESCRIPTION

Figure 1:
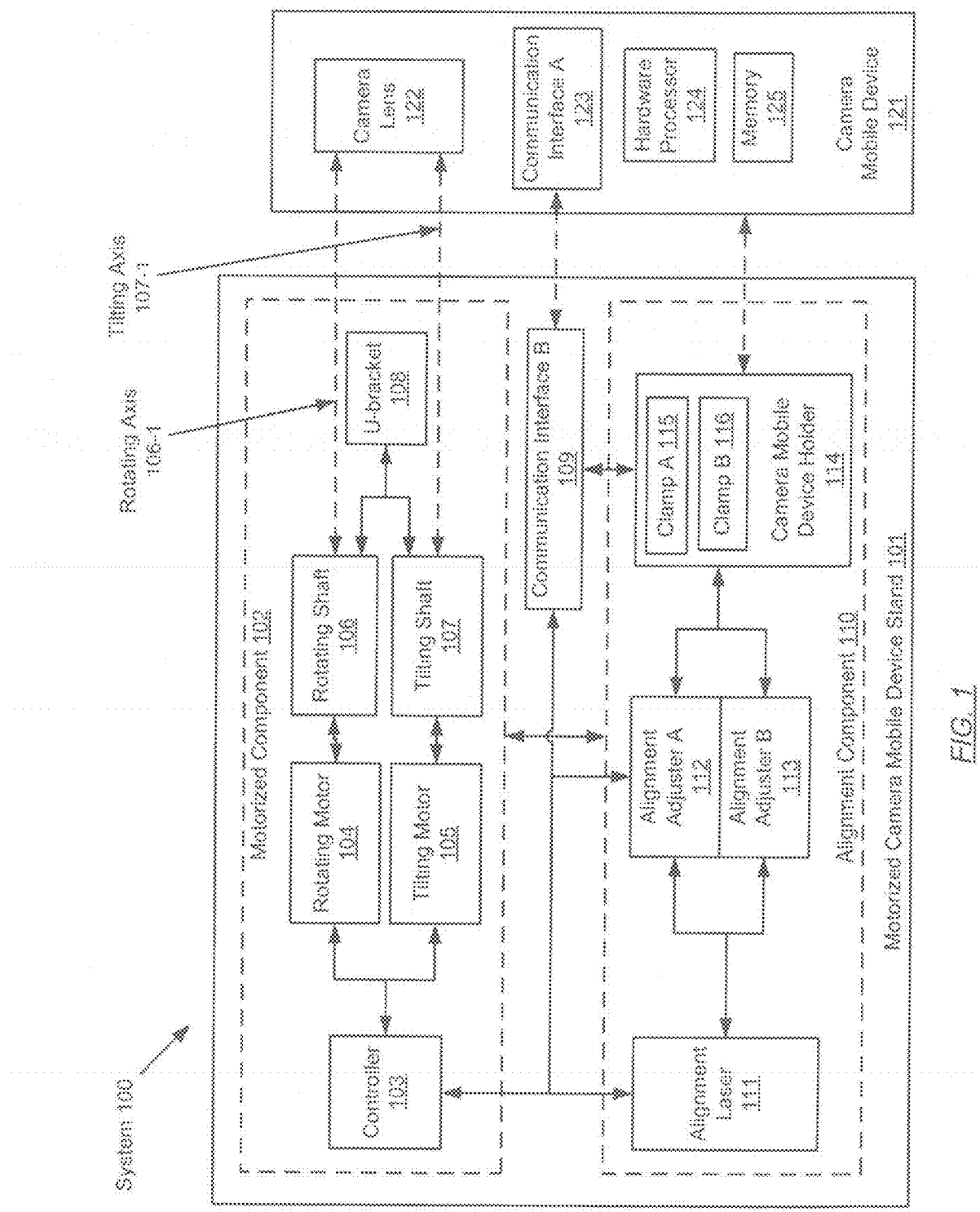
FIG. 1 shows a schematic block diagram of a motorized camera mobile device stand in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for a motorized camera mobile device stand. In particular, the motorized camera mobile device stand is an electro-mechanical assembly that holds or otherwise positions a camera mobile device in a sequence of positions for capturing a collection of images to generate a panorama. Although the camera mobile device may be used without the motorized camera mobile device stand, the image capturing for generating the panorama is automated and improved by using the motorized camera mobile device stand.

In one or more embodiments of the invention, the motorized camera mobile device stand includes a motorized component and an alignment component. The motorized component is configured to place the camera mobile device in the sequence of positions in response to a command signal received from the camera mobile device. In particular, the sequence of positions includes a combination of rotation angles and tilting angles where the rotation axis intersects the tilting axis at the location of a camera lens of the camera mobile device. Further, the alignment component is configured to (i) substantially align, prior to receiving the command signal and based on a laser beam, the rotation axis with the camera lens, (ii) substantially align, prior to receiving the command signal and based on the laser beam, the tilting axis with the camera lens, and (iii) constrain the camera mobile device during image capture such that the camera lens substantially overlaps the intersection of the rotation axis and the tilting axis in each of the sequence of positions.

In one or more embodiments, the intersection of the rotation axis and the tilting axis is stationary independent of the rotating/tilting angles of the motorized camera mobile device stand. Once substantially aligned to the intersection point, the location of the camera lens remains substantially stationary while capturing the collection of images throughout various rotating/tilting angles of the motorized camera mobile device stand. Accordingly, the images are stitched together with reduced distortion to improve the quality of the panorama.

FIG. 1 shows a system (100) in accordance with one or more embodiments. In one or more embodiments, one or more of the modules and elements shown in FIG. 1 may be omitted, repeated, and/or substituted. Accordingly, embodiments of the invention should not be considered limited to the specific arrangements of modules shown in FIG. 1.

Figure 4:
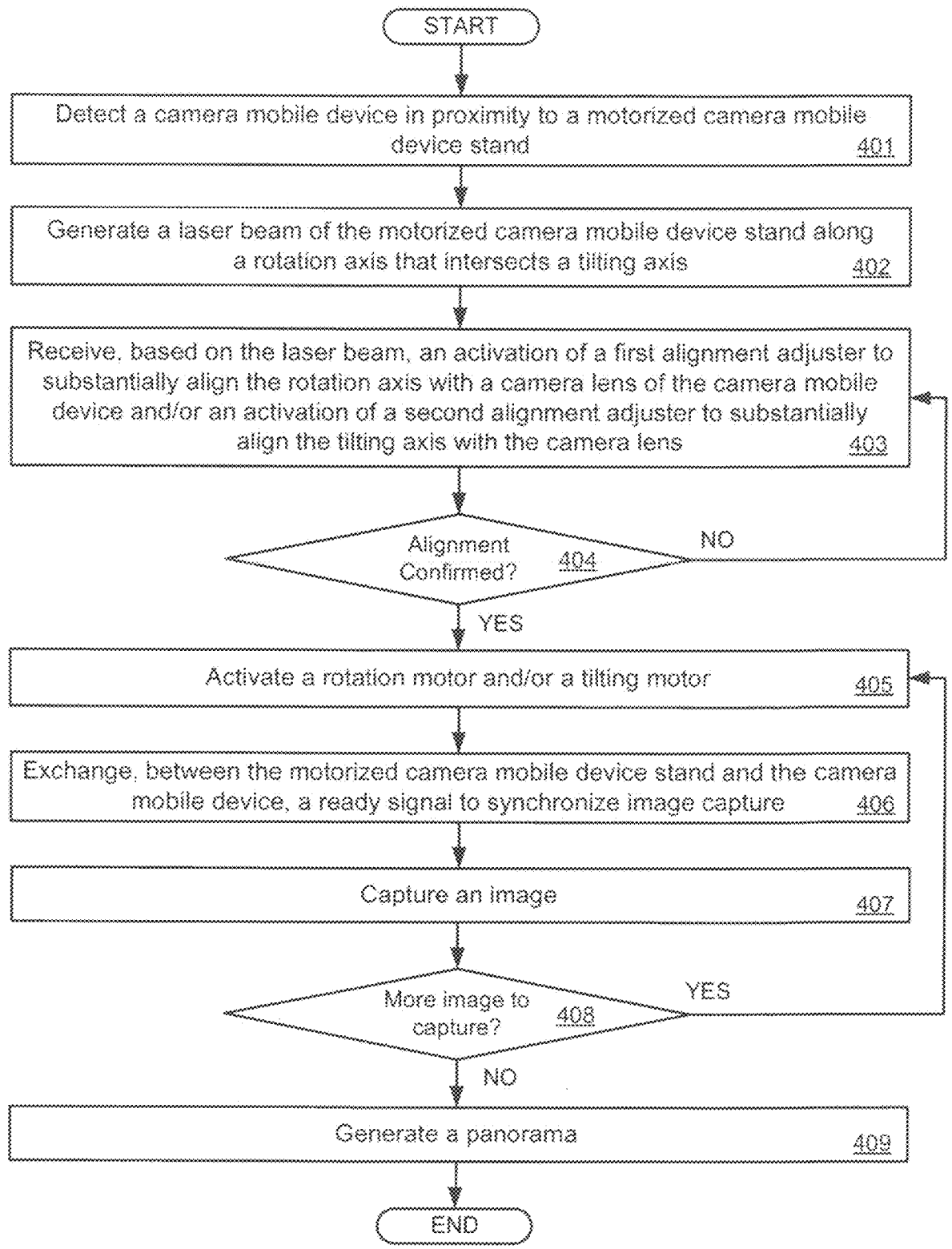
FIG. 4 shows a flowchart in accordance with one or more embodiments of the invention.

As shown in FIG. 1, the system (100) includes the motorized camera mobile device stand (101) and the camera mobile device (121). As noted above, the camera mobile device (121) is a mobile device with a built-in camera having a camera lens (122). In addition, the camera mobile device (121) includes a hardware processor (124) and associated memory (125), as well as a communication interface A (123), such as a Bluetooth interface, a near field communication (NFC) interface, a USB interface, or other wireless/wired communication interfaces. In one or more embodiments, the memory (125) is configured to store instructions that, when executed, cause the hardware processor (124) to perform image capturing functionalities using the camera lens (122) and to perform additional functionalities of the camera mobile device (121). In one or more embodiments, the camera mobile device (121) performs the image capturing functionalities using the camera lens (122) according to the method flowchart described in reference to FIG. 4 below. In one or more embodiments, the memory (125) stores instructions described above as well as additional instructions to perform one or more portions of the method flowchart described in reference to FIG. 4 below. In one or more embodiments, the instructions described above as well as to perform one or more portions of the method flowchart described in reference to FIG. 4 are part of a mobile application, or mobile app, which is a user-installable software application designed to run on a smartphone or other mobile devices. In one or more embodiments, the camera mobile device (121) is based on the computing system described in reference to FIG. 7 below. In one or more embodiments, the camera mobile device (121) is physically separate from the motorized camera mobile device stand (101) and may be used without the motorized camera mobile device stand (101).

Figure 2:
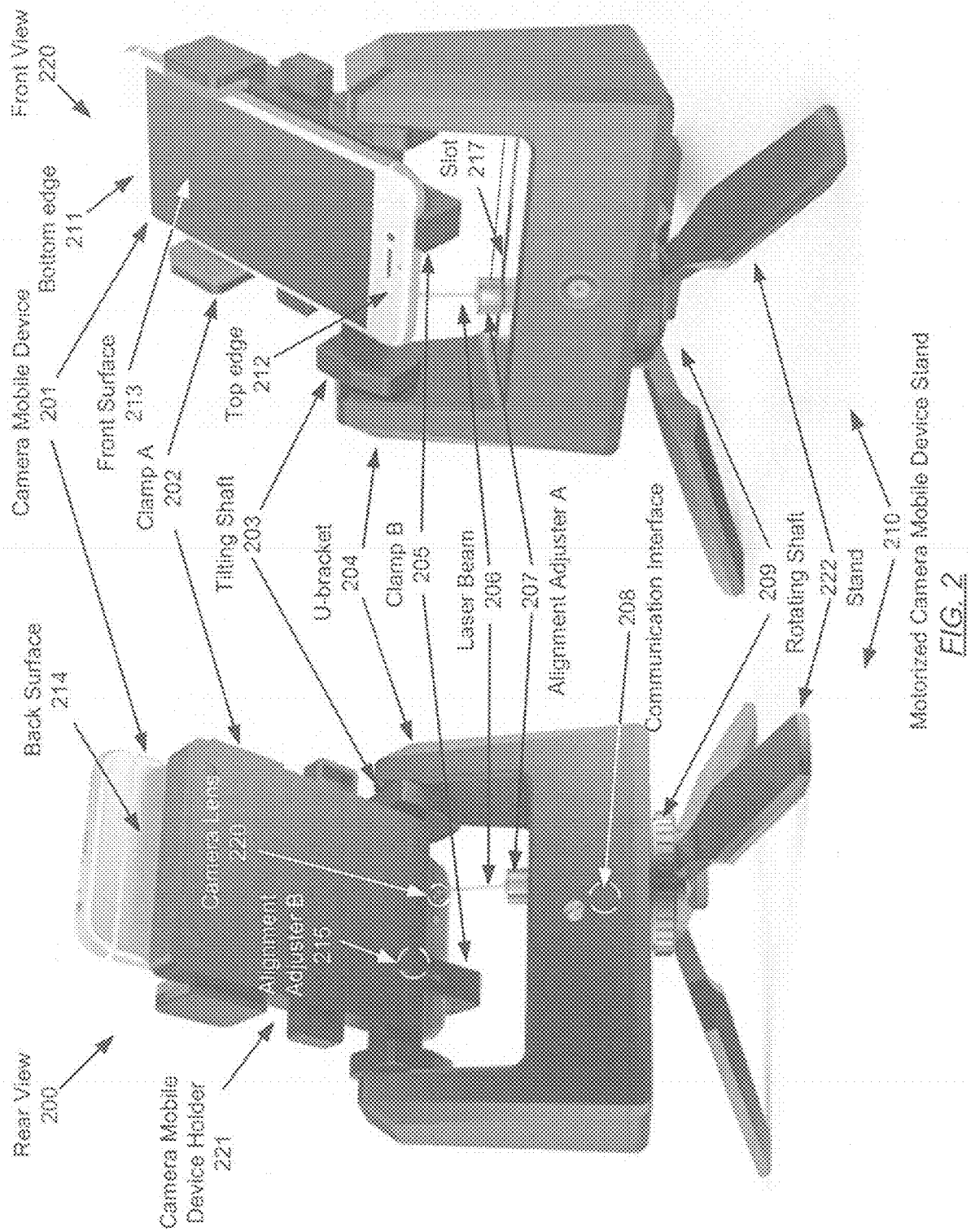
FIGS. 2 and 3 show various views of a motorized camera mobile device stand in accordance with one or more embodiments of the invention.
Figure 3:
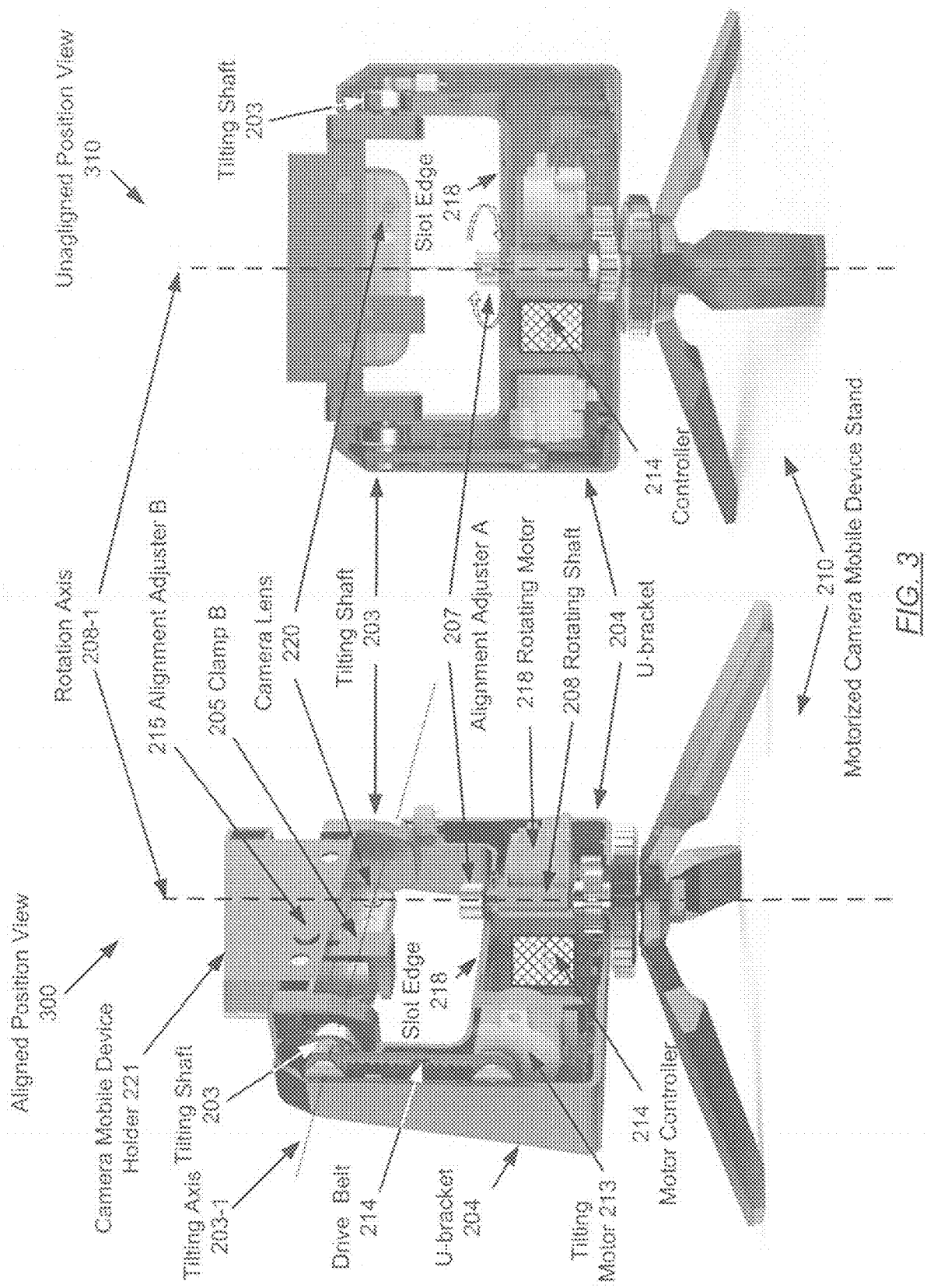

In one or more embodiments of the invention, the motorized camera mobile device stand (101) is an electro-mechanical assembly that includes a motorized component (102), an alignment component (110), and a communication interface B (109). The motorized component (102) includes a controller (103), a rotating motor (104) coupled to a rotating shaft (106), a tilting motor (105) coupled to a tiling shaft (107), and a U-bracket that encloses or otherwise mechanically supports the controller (103), rotating motor (104), rotating shaft (106), tilting motor (105), and tiling shaft (107). In one or more embodiments, the rotating shaft (106) is rotatable by the rotating motor (104) and defines a rotating axis (106-1). Similarly, the tilting shaft (107) is rotatable by the tilting motor (105) and defines a tilting axis (107-1). An example of the rotating shaft (106), rotating motor (104), rotating axis (106-1), tilting shaft (107), tilting motor (105), tilting axis (107-1), and communication interface B (109) is depicted in FIGS. 2 and 3 below.

Figure 5:
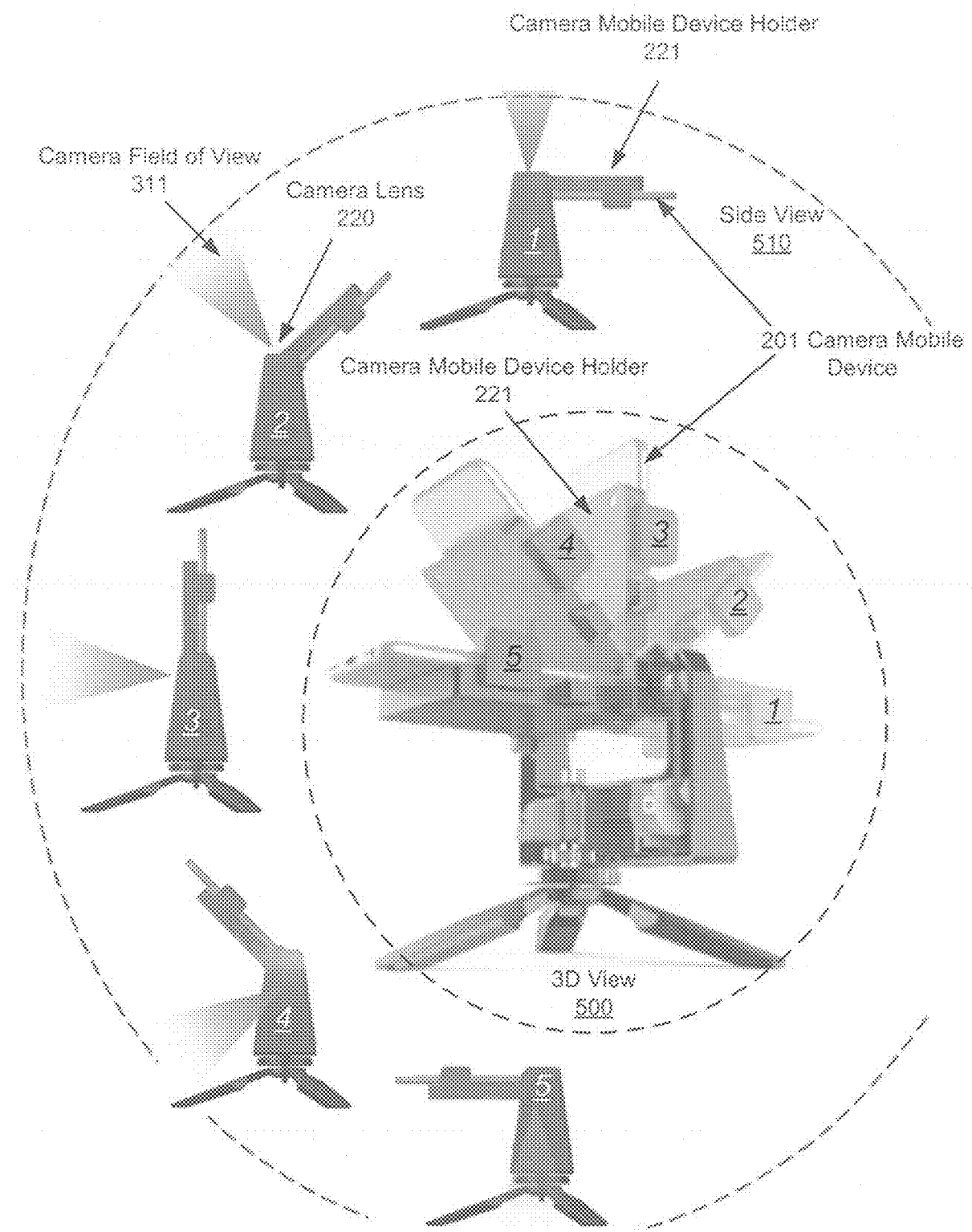
FIGS. 5 and 6 show an example in accordance with one or more embodiments of the invention.
Figure 6:
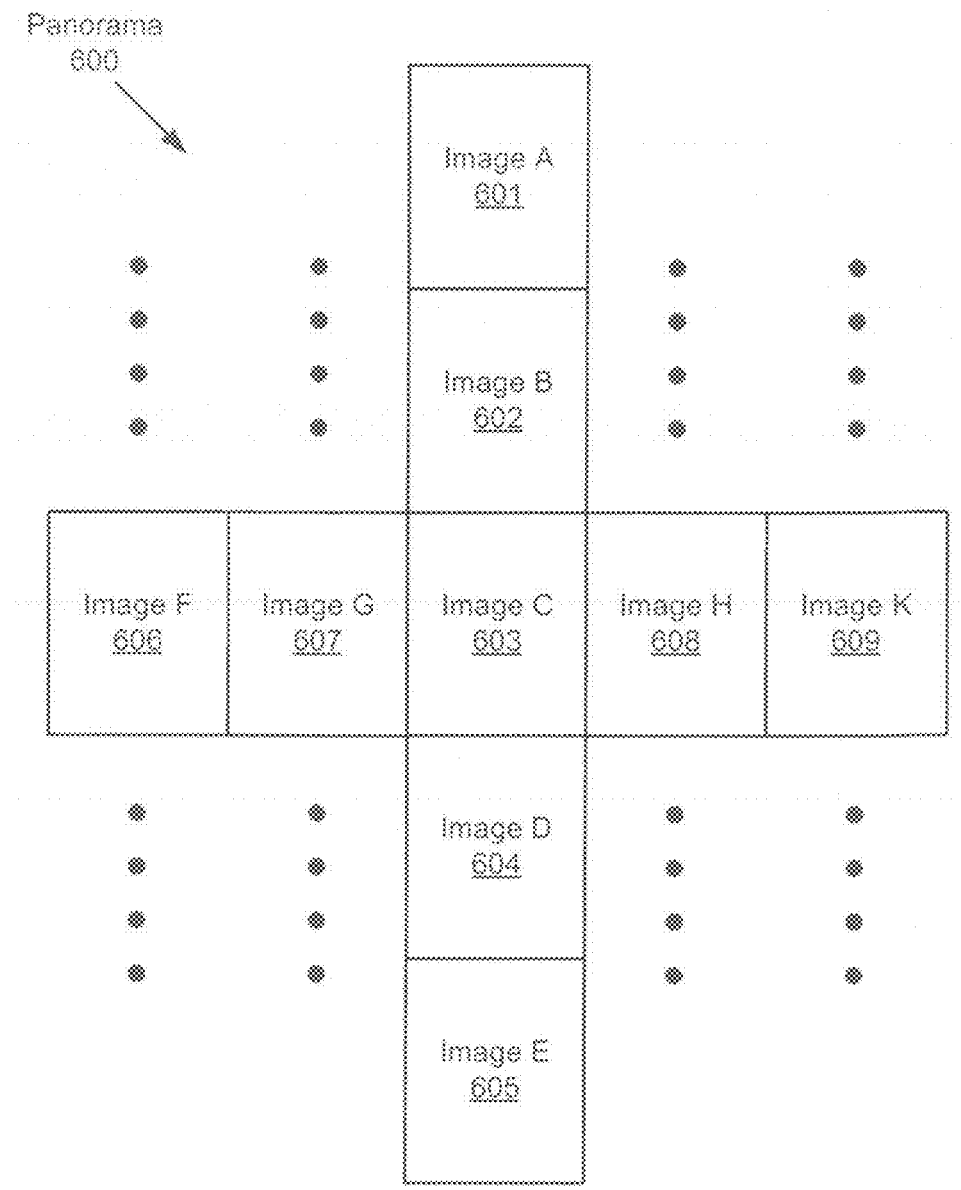

In one or more embodiments, the controller (103) includes a hardware component, a software component, or a combination thereof. The controller (103) is configured to control the rotating motor (104) and tilting motor (107) in response to a motor command signal from the camera mobile device (121). In one or more embodiments, the controller (103) receives the motor command signal from the camera mobile device (121) via the communication interface B (109). For example, the communication interface B (109) may include a hardware component, a software component, or a combination thereof. The communication interface B (109) may use a communication protocol (e.g., based on Bluetooth, NFC, USB, or other wireless/wired communication interfaces) compatible with the communication interface A (123) to receive various command signals, such as the motor command signal and a alignment command signal described below. In one or more embodiments, the controller (103) activates, in response to the motor command signal, the rotating motor (104) to rotate the rotating shaft (106) through a number of rotation angles. In one or more embodiments, the controller (103) activates, in response to the motor command signal, the tilting motor (105) to rotate the tilting shaft (107) through a number of tilting angles. The combination of the rotation angles and the tiling angles positions the camera mobile device holder (114) (described below) in a sequence of positions. When the camera mobile device (121) is placed in the camera mobile device holder (114), the sequence of positions allow the camera mobile device (121) to capture a collection of images that are stitched into a panorama with reduced distortion. In one or more embodiments, one or more of the rotating motor (104) and tilting motor (107) is a stepping motor. In such embodiments, the motor command signal includes a value of the rotation angle and/or tilting angle for each of the sequence of positions where the stepping motor is driven by the value to reach each individual position. An example of the sequence of positions for panorama image capture is depicted in FIGS. 5 and 6 below. In one or more embodiments, the controller (103) performs its functionalities using the method described in reference to FIG. 4 below. In one or more embodiments, the controller (103) includes a computer processor and a non-transitory computer readable medium (e.g., computer memory). In particular, the non-transitory computer readable medium stores instructions described above as well as additional instructions to perform one or more portions of the method described in reference to FIG. 4 below. For example, the instructions stored in the computer memory of the controller (103) may be referred to as embedded software.

In one or more embodiments, the alignment component (110) includes an alignment laser (111), an alignment adjuster A (112), an alignment adjuster B (113), and the aforementioned camera mobile device holder (114). In one or more embodiments, the alignment laser (111) is mechanically coupled to the rotating motor (104) and configured to generate a laser beam. For example, the laser beam may be manually turned on or off by a user. In another example, the laser beam may be turned on or off in response to an alignment command signal received from the camera mobile device (121) via the communication interface B (109). Specifically, the laser beam propagates along the rotating axis (106-1) and intersects the tilting axis (107-1). In one or more embodiments, the alignment adjuster A (112) is configured to substantially align, based on the laser beam, the rotating axis (106-1) with the camera lens (122). Further, the alignment adjuster B (113) is configured to substantially align, based on the laser beam, the tilting axis (107-1) with the camera lens (122). In one or more embodiments, when the camera mobile device (121) is placed in the aforementioned camera mobile device holder (114), the rotating axis (106-1) and the tilting axis (107-1) are aligned with the camera lens (122) by positioning the U-bracket (108) and the camera mobile device (121) in respective aligned positions. In one or more embodiments, the intersection of the rotating axis (106-1) and the tilting axis (107-1) is stationary independent of the rotating/tilting angles of the motorized camera mobile device stand (101). Once substantially aligned to the intersection point, the location of the camera lens (122) remains substantially stationary independent of the rotating/tilting angles of the motorized camera mobile device stand (101).

In one or more embodiments, the alignment adjuster A (112) is configured to slide the U-bracket (108) into an aligned position of the U-bracket (108). Further, the alignment adjuster B (113) is configured to slide the camera mobile device (121) into an aligned position of the camera mobile device (121). Specifically, the alignment adjuster A (112) slides, with respect to the rotating axis (106-1), the U-bracket (108) along the tilting axis (107-1) into the aligned position. In other words, the alignment adjuster A (112) moves the U-bracket (108) along a direction parallel to the tilting axis (107-1) and in a back-and-forth motion with respect to the rotating axis (106-1) until the aligned position of the U-bracket (108) is reached. Further, when the camera mobile device (121) is placed in the aforementioned camera mobile device holder (114), the alignment adjuster B (113) is configured to slide, with respect to the tilting axis (107-1), the camera mobile device (121) along the rotating axis (106-1) into the aligned position. In other words, the alignment adjuster B (113) moves the camera mobile device (121) along a direction parallel to the rotating axis (106-1) and in a back-and-forth motion with respect to the tilting axis (107-1) until the aligned position of the camera mobile device (121) is reached.

In one or more embodiments, the alignment adjuster A (112) and alignment adjuster B (113) cooperatively slide the U-bracket (108) and the camera mobile device (121) into the respective aligned positions in response to mechanical manipulations by a user. In one or more embodiments, the alignment adjuster A (112) and alignment adjuster B (113) cooperatively slide the U-bracket (108) and the camera mobile device (121) into the respective aligned positions in response to the alignment command signal from the camera mobile device (121). In such embodiments, the camera mobile device (121) uses the camera lens (122) to detect the laser beam for determining that the respective alignment positions are reached by both the U-bracket (108) and the camera mobile device (121). Once the respective alignment positions of the U-bracket (108) and the camera mobile device (121) are reached, the alignment adjuster A (112) and alignment adjuster B (113) may hold the U-bracket (108) and the camera mobile device (121) in the respective aligned positions and maintain the laser beam to substantially align with the camera lens (122).

In one or more embodiments, the camera mobile device holder (114) includes a clamp A (115) and a clamp B (116) that are collectively configured to hold the camera mobile device (121) in each of the aforementioned sequence of positions. In one or more embodiments, the alignment adjuster B (113) is configured to unlock one or more clamps to slide, with respect to the tilting axis (107-1), the camera mobile device (121) along the rotating axis (106-1) into the aligned position of the camera mobile device (121). In one or more embodiments, the alignment adjuster B (113) unlocks one or more clamps, to slide the camera mobile device (121) into the aligned position, in response to mechanical manipulations by a user. In one or more embodiments, the alignment adjuster B (113) unlocks one or more clamps, to slide the camera mobile device (121) into the aligned position, in response to the alignment command signal from the camera mobile device (121).

An example of aligning the rotating axis (106-1) and the tilting axis (107-1) with the camera lens (122) by positioning the U-bracket (108) and the camera mobile device (121) in respective aligned positions is depicted in FIG. 3 below.

FIG. 2 shows an embodiment of the system (100) depicted in FIG. 1 above.

Specifically, FIG. 2 shows a rear view (200) and a front view (220) of an example of the system (100). In one or more embodiments, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the rear view (200) and front view (220) show the camera mobile device (201) placed in the camera mobile device holder (221) of the motorized camera mobile device stand (210). In particular, the camera mobile device (201), camera mobile device holder (221), and motorized camera mobile device stand (210) correspond to and are examples of the camera mobile device (121), camera mobile device holder (114), and motorized camera mobile device stand (101) depicted in FIG. 1 above. Further as shown in FIG. 2, the clamp A (202), tilting shaft (203), U-bracket (204), clamp B (205), alignment adjuster A (207), communication interface (208), rotating shaft (209), camera lens (220), and alignment adjuster B (215) correspond to and are examples of the clamp A (115), tilting shaft (107), U-bracket (108), clamp B (116), alignment adjuster A (112), communication interface B (109), rotating shaft (106), camera lens (122), and alignment adjuster B (113) depicted in FIG. 1 above. In addition, the laser beam (206) is generated by an alignment laser (not shown) that corresponds to the alignment laser (111) depicted in FIG. 1 above.

In one or more embodiments, the U-bracket (204) is coupled with and rotatable by the rotating shaft (209) for placing the camera mobile device holder (221) in a number of rotation angles. In one or more embodiments, the U-bracket (204) is coupled with the camera mobile device holder (221) via the tilting shaft (203) where the camera mobile device holder (221) is tiltable by the tilting shaft (203) for placing the camera mobile device holder (221) in a number of tilting angles. In one or more embodiments, the motorized camera mobile device stand (210) includes a stand (222) to maintain the motorized camera mobile device stand (210) at a user-selected location for generating the panorama.

In the example shown in FIG. 2, the camera mobile device (201) is a smart phone in a rectangular shape having a front surface (213), back surface (214), top edge (212), and bottom edge (211). Specifically, the back surface (214) is one surface of the smart phone where the camera lens (220) is located. The front surface (213) is another surface opposite to the back surface (214). The top edge (212) is one shorter edge of the rectangular shape nearest to the camera lens (220). The bottom edge (211) is another shorter edge of the rectangular shape opposite to the top edge (212). As shown in FIG. 2, the camera mobile device (201) is placed in the camera mobile device holder (221) with the top edge (212) closer to the tilting shaft (203) than the bottom edge (211). In other words, the bottom edge (211) traverses a circumference of an arc while the top edge (212) remains near the center of the arc as the tilting shaft (203) tilts the camera mobile device holder (221) through various tilting angles. In particular, the camera mobile device (201) is locked or otherwise constrained in the camera mobile device holder (221) by the clamp A (202) and clamp B (205). For example, the camera mobile device (201) remains secured in the camera mobile device holder (221) while being rotated and/or tilted through various rotation/tilting angles.

FIG. 3 shows an aligned position view (300) and an unaligned position view (310) of the example of the system (100) as depicted in FIG. 2 above. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

In addition to the components described in reference to FIG. 2 above, FIG. 3 shows the rotation axis (208-1), rotating motor (218), controller (214), tilting axis (203-1), and tilting motor (213) that correspond to and are examples of the rotating axis (106-1), rotating motor (104), controller (103), tilting axis (107), and tilting motor (105) depicted in FIG. 1 above. Further, the rotating motor (218) is shown to couple to the rotating shaft (208) via mechanical gears where the center line of the rotating shaft (208) defines the rotation axis (208-1). Similarly, the tilting motor (213) is shown to couple to the tilting shaft (203) via a drive belt (214) where the center line of the tilting shaft (203) defines the tilting axis (203-1).

In one or more embodiments, the U-bracket (204) encloses or otherwise mechanically supports the controller (214), rotating motor (218), rotating shaft (208), tilting motor (213), and tiling shaft (203). In the example shown in FIG. 3, the U-bracket (204) is coupled with and rotatable by the rotating shaft (208) for placing the camera mobile device holder (221) in various rotation angles. For example, rotation through various rotation angles is represented by two circular arrows surrounding the rotation axis (208-1) in the unaligned position view (310). Further, the U-bracket (204) is coupled with the camera mobile device holder (221) via the tilting shaft (203) where the camera mobile device holder (221) is tiltable by the tilting shaft (203) for placing the camera mobile device holder (221) in various tilting angles. For example, the tilting angle may be defined as the angle between the back surface (214) of the camera mobile device (201) and a horizontal surface (not shown) where the motorized camera mobile device stand (210) is placed.

In one or more embodiments, an alignment laser (not shown in FIG. 3) is mechanically coupled to the rotating motor (218) and generates a laser beam (not shown in FIG. 3) that propagates along the rotation axis (208-1) and intersects the tilting axis (203-1). In other words, the laser beam marks the path of the rotation axis (208-1) and renders the rotation axis (208-1) visible to a user. Further, the laser beam may be sensed by the camera lens (220) to generate an electronic confirmation of alignment when the rotation axis (208-1) intersects the camera lens (220). In one or more embodiments, the U-bracket (204) is coupled with the rotating shaft (208) via the alignment adjuster A (207). For example, the alignment adjuster A (207) may be manipulated (e.g., turned around the rotation axis (208-1)) by a user to slide the U-bracket (204) along the slot edge (218) until the camera lens (220) is as close to the rotation axis (208-1) as possible. In other words, the user may manipulate the alignment adjuster A (207) until the camera lens (220) is visibly as close to the laser beam as possible. In particular, the slot edge (218) corresponds to the slot (217) shown in FIG. 2 above.

In one or more embodiments, with the camera mobile device (201) placed in the camera mobile device holder (221), the alignment adjuster B (113) is configured to unlock the clamp B (205) in response to a physical push action of a user. Accordingly, the user may slide the camera mobile device (201), with respect to the tilting axis (203-1), along the rotation axis (208-1) into the aligned position. In other words, the user may move the camera mobile device (121) along a direction parallel to the rotation axis (208-1) and in a back-and-forth motion with respect to the tilting axis (203-1) until the camera lens (220) is visibly as close to the laser beam as possible. By the user successively sliding the U-bracket (204) back-and-forth along the slot edge (218) and sliding the camera mobile device (201) back-and-forth along the rotation axis (208-1), the camera lens (220) may be positioned as close as possible to the intersection point where the rotation axis (208-1) intersects the tilting axis (203-1). For example, the camera lens (220) may be positioned within 1 mm (milli-meter), 2 mm, or other predetermined range from the intersection point. The predetermined range may be dependent on a diameter of the laser beam, a diameter of the camera lens (220), a tolerance of fabricating the motorized mobile device stand (210), etc. When the camera lens (220) is positioned within the predetermined range, the camera lens (220) is said to be substantially aligned to the rotation axis (208-1) and the tilting axis (203-1). Once substantially aligned to the rotation axis (208-1) and the tilting axis (203-1), the location of the camera lens (220) remains substantially stationary independent of rotating/tilting angles of the motorized camera mobile device stand (210).

In one or more embodiments, the alignment adjuster A (207) may slide the U-bracket (204) along the slot edge (218) in response to an alignment command signal from the camera mobile device (201). Further, the alignment adjuster B (113) may unlock the clamp B (205) and slide the camera mobile device (121) into the aligned position in response to the alignment command signal. Further, the laser beam may be turned on in response to the alignment command signal to confirm that the automatic alignment is successful. In one or more embodiments, the camera mobile device (201) establishes a communication link with the motorized camera mobile device stand (210) upon the camera mobile device (201) detecting that the motorized camera mobile device stand (210) is in proximity, i.e., within a detectable range based on the communication protocol used by the communication interface (208). In response to the detecting, the alignment command signal may be sent from the camera mobile device (201) to initiate an automatic alignment procedure.

In one or more embodiments, subsequent to the manual or automatic alignment procedure described above, the controller (214) activates, in response to a motor command signal from the camera mobile device (201), the rotating motor (218) to rotate the rotating shaft (208) through a number of rotation angles. In one or more embodiments, the controller (214) activates, in response to the motor command signal, the tilting motor (213) to rotate the tilting shaft (203) through a number of tilting angles. The combination of the rotation angles and the tiling angles positions the camera mobile device holder (221) in a sequence of positions. When the camera mobile device (201) is placed in the camera mobile device holder (221), the sequence of positions allow the camera mobile device (201) to capture a collection of images that are stitched into a panorama with reduced distortion. In one or more embodiments, in response to the rotating shaft (208) reaching each of the rotation angles and the tilting shaft (203) reaching each of the tilting angles, the motorized camera mobile device stand (210) communicates with the camera mobile device (201) to synchronize the image capturing and the positions of the camera mobile device. For example, when reaching and stabilizing at each individual position, the motorized camera mobile device stand (210) may send a ready signal to trigger the camera mobile device (201) to capture an image. An example of the sequence of positions for panorama image capture is depicted in FIGS. 5 and 6 below.

In one or more embodiments, one or more of the automatic features described above (e.g., proximity detection, automatic alignment, image capture synchronization, etc.) are performed by software programs installed on the motorized camera mobile device stand and/or the camera mobile device. For example, the motorized camera mobile device stand may include embedded software (e.g., firmware) and the camera mobile device may be installed a mobile application software commonly referred to as "mobile app".

Although embodiments of the motorized camera mobile device stand are described with a free-standing configuration in FIGS. 2 and 3 above, one or more embodiments may include a hand-held configuration. For example, the stand (222) depicted in FIGS. 2 and 3 may be substituted with a hand-held handle that the user may hold stationary to capture the sequence of images of a panorama.

FIG. 4 shows a flowchart in accordance with one or more embodiments. The process shown in FIG. 4 may be executed, for example, by one or more components discussed above in reference to FIGS. 1-3. One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, in Step 401, proximity between a motorized camera mobile device stand and a camera mobile device is detected. In one or more embodiments, the detection is made by a user placing the camera mobile device onto the motorized camera mobile device stand. In one or more embodiments, the detection is made based on detection signals exchanged between communication interfaces of the motorized camera mobile device stand and the camera mobile device. In one or more embodiments, the communication interfaces are controlled by software programs installed on the motorized camera mobile device stand and the camera mobile device to perform the detection.

In Step 402, in response to detecting the proximity, a laser beam of the motorized camera mobile device stand is initiated. In one or more embodiments, the laser beam is generated by an alignment laser coupled to a rotating motor of the motorized camera mobile device stand. In particular, the laser beam propagates along the rotation axis and intersects a tilting axis of the motorized camera mobile device stand. In one or more embodiments, the alignment laser is turned on by a user. In one or more embodiments, the alignment laser is automatically turned on in response to the motorized camera mobile device stand detecting the proximity of the camera mobile device.

In Step 403, based on the laser beam, an activation of a first alignment adjuster and/or an activation of a second alignment adjuster is received. In one or more embodiments, the activation of the first alignment adjuster is received to substantially align the rotation axis with a camera lens of the camera mobile device. Further, the activation of the second alignment adjuster is received to substantially align the tilting axis with the camera lens. In one or more embodiments, the activation is by a user manually manipulating the first alignment adjuster and/or the second alignment adjuster. In one or more embodiments, the first alignment adjuster and/or the second alignment adjuster is automatically activated by an alignment command signal from the camera mobile device. During alignment, the camera mobile device is placed in a camera mobile device holder that is coupled, via a tilting shaft, to a U-bracket of the motorized camera mobile device stand.

In one or more embodiments, the activation of the first alignment adjuster causes the U-bracket to slide along the tilting axis. In particular, the U-bracket slides with respect to the rotation axis such that the camera lens moves toward the rotation axis.

In one or more embodiments, the activation of the second alignment adjuster unlocks a clamp on the camera mobile device holder to allow the camera mobile device to slide along the rotation axis. In particular, the camera mobile device slides in the camera mobile device holder with respect to the tilting axis such that the camera lens moves toward the tilting axis.

In Step 404, a determination is made as to whether the alignment is confirmed. If the determination is negative, i.e., the camera lens is not yet substantially aligned to the rotation axis and the tilting axis, the method returns to Step 403. If the determination is positive, i.e., the camera lens is substantially aligned to the rotation axis and the tilting axis, the method proceeds to Step 405.

In one or more embodiments, the alignment confirmation is determined by a user visually verifying the laser beam overlapping or otherwise impinging on the camera lens. In one or more embodiments, the alignment confirmation is automatically determined based on the camera lens senses the laser beam when the laser beam overlapping or otherwise impinging on the camera lens.

Once substantially aligned, the U-bracket is held in an aligned position of the U-bracket. Further, the clamp is locked to hold the camera mobile device in an aligned position of the camera mobile device.

In Step 405, a rotation motor and/or a tilting motor is activated to place the camera mobile device in one of a sequence of positions for capturing an image of a panorama. In particular, each individual position corresponds to a combination of a rotation angle of the rotation motor and a tilting angle of the tilting motor. In one or more embodiments, the rotation motor rotates the U-bracket via the rotating shaft to a particular rotation angle. Further, the tilting motor tilts the mobile device holder via the tilting shaft to a particular tilting angle. Accordingly, the camera mobile device is placed in one of the sequence of positions with the camera lens pointing to a corresponding direction. While being rotated by the rotation motor and/or tilted by the tilting motor, the camera mobile device is constrained by the motorized camera mobile device stand such that the camera lens substantially overlaps an intersection of the rotation axis and the tilting axis throughout the rotating and/or tilting action.

In one or more embodiments, the rotation motor and/or tilting motor is activated by a user. In one or more embodiments, the rotation motor and/or tilting motor is automatically activated in response to a command signal from the camera mobile device.

In Step 406, a ready signal is exchanged between the motorized camera mobile device stand and the camera mobile device to synchronize image capture. In one or more embodiments, the motorized camera mobile device stand sends the ready signal to the camera mobile device to trigger the image capture. For example, the ready signal may be sent when the rotating shaft and/or the tilting shaft reach the particular rotating angle and/or tilting angle. In one or more embodiments, the ready signal specifies the particular rotating angle and/or tilting angle reached by the rotating shaft and/or the tilting shaft. In one or more embodiments, the camera mobile device sends the ready signal to the motorized camera mobile device stand to advance to next position. For example, the ready signal may be sent when the image capture is complete at the current position. In one or more embodiments, the ready signal specifies the next rotating angle and/or next tilting angle to be reached by the rotating shaft and/or the tilting shaft.

In Step 407, an image is captured using the camera lens of the camera mobile device. In one or more embodiments, the image is one in a sequence of images to generate a panorama. In one or more embodiments, the image is indexed with the particular rotation angle and tilting angle of the position where the camera mobile device captures the particular image.

In Step 408, a determination is made as to whether any more image remains to be captured. If the determination is positive, i.e., at least one more image remains to be captured, the method returns to Step 405. If the determination is negative, i.e., no more image remains to be captured, the method proceeds to Step 409.

In Step 409, a panorama is generated by stitching together the sequence of images captured through the iterations of Step 405 through Step 408. In one or more embodiments, the panorama is generated by the camera mobile device according to the rotation angle and tilting angle of each of the sequence of images. As noted above, the camera lens remains substantially overlapping the intersection of the rotation axis and the tilting axis throughout the sequence of images captured through the iterations of Step 405 through Step 408. Because the intersection of the rotation axis and the tilting axis is stationary independent of the rotating/tilting angles, the sequence of images are stitched together with reduced distortion to improve the quality of the panorama.

In one or more embodiments, a series of panoramas are generated at a series of time points and processed to generate a media file for virtual reality application.

FIGS. 5 and 6 show an example in accordance with one or more embodiments of the invention. The example shown in FIGS. 5 and 6 may be, for example, based on one or more components depicted in FIGS. 1-3 above and the method flowchart depicted in FIG. 4 above. In one or more embodiments, one or more of the modules and elements shown in FIGS. 5 and 6 may be omitted, repeated, and/or substituted. Accordingly, embodiments of the invention should not be considered limited to the specific arrangements of modules shown in FIGS. 5 and 6.

As shown in FIG. 5, the 3-dimensional (3D) view (50) corresponds to a sequence of five image capture positions of an example system described in reference to FIGS. 1-3 above. Each of the 5 image capture positions is denoted by a corresponding numeral tagged to the camera device holder (221) holding the camera mobile device (201), as shown in the 3D view (500). Further, the side view (510) shows individual views of the five image capture positions illustrating the corresponding camera field of view (311). Specifically, the camera field of view (311) is oriented according to a sequence of tilting angles described in reference to FIGS. 1-3 above. At each of the five image capture positions, an image is captured by camera mobile device (201) using the camera lens (220). Each image is indexed with a corresponding tilting angle.

FIG. 6 shows a panorama (600) that is generated by stitching a matrix of images together. For example, the image A (601), image B (602), image C (603), image D (604), and image E (605) may correspond to the five images captured at the five image capture positions depicted in FIG. 5 above. Specifically, each of the image A (601), image B (602), image C (603), image D (604), and image E (605) corresponds to one of the five tilting angles depicted in FIG. 5 above. In another example, the image F (606), image G (607), image C (603), image H (608), and image K (609) may correspond to five rotation angles of the motorized camera mobile device stand.

Although embodiments of the motorized camera mobile device stand described above are based on an alignment laser to facilitate alignment of the camera lens, it is contemplated that the alignment laser may be substituted with a mechanical sighting mechanism, such as a sighing device used to assist aligning or aiming weapons, surveying instruments, or other items by a human eye.

Figure 7A:
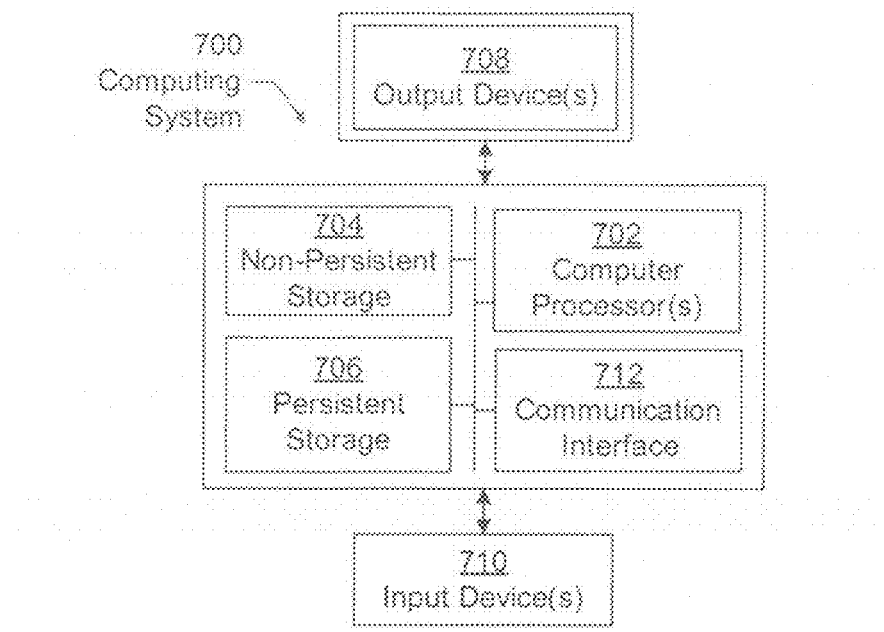
FIG. 7 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
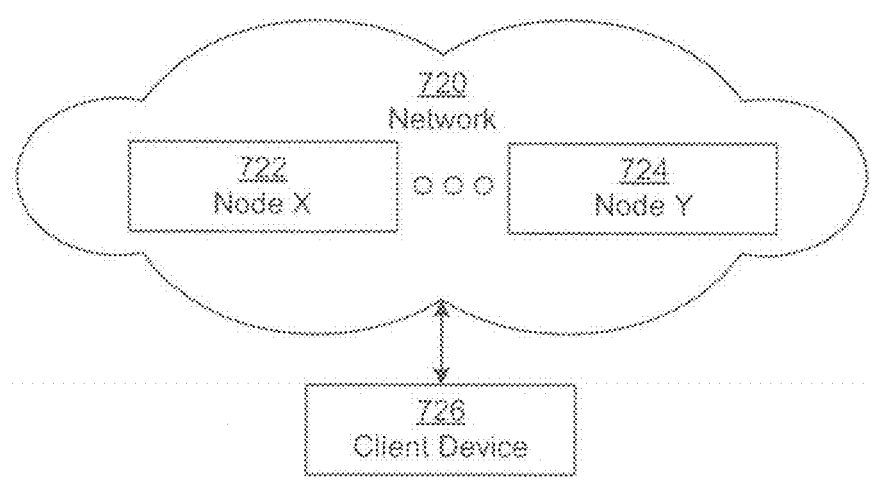

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A motorized camera mobile device stand, comprising:
a motorized component configured to:
  receive a command signal from a camera mobile device; and
  place, in response to the command signal, the camera mobile device in a plurality of positions for capturing a plurality of images,
  wherein the plurality of positions comprise a plurality of rotation angles with respect to a rotation axis and a plurality of tilting angles with respect to a tilting axis, wherein the rotation axis intersects the tilting axis; and
an alignment component configured to:
  substantially align, prior to receiving the command signal and based on a laser beam, the rotation axis with a camera lens of the camera mobile device;
  substantially align, prior to receiving the command signal and based on the laser beam, the tilting axis with the camera lens; and
  constrain the camera mobile device such that the camera lens substantially overlaps an intersection of the rotation axis and the tilting axis in each of the plurality of positions.

2. The motorized camera mobile device stand of claim 1, the motorized component comprising:
a rotating motor and a tilting motor;
a rotating shaft coupled to and rotatable by the rotating motor,
  wherein the rotating shaft defines the rotation axis;
a tilting shaft coupled to and rotatable by the tilting motor, wherein the tilting shaft defines the tilting axis; and
a controller configured to:
  receive the command signal from the camera mobile device;
  activate, in response to the command signal, the rotating motor to rotate the rotating shaft through the plurality of rotation angles; and
  activate, in response to the command signal, the tilting motor to rotate the tilting shaft through the plurality of tilting angles.

3. The motorized camera mobile device stand of claim 2, the alignment component comprising:
an alignment laser coupled to the rotating motor and configured to generate the laser beam along the rotation axis and intersecting the tilting axis;
a first alignment adjuster configured to substantially align, based on the laser beam, the rotation axis with the camera lens; and
a second alignment adjuster configured to substantially align, based on the laser beam, the tilting axis with the camera lens.

4. The motorized camera mobile device stand of claim 3, the motorized component further comprising:
a stand coupled to the rotating motor and configured to maintain the motorized camera mobile device stand at a user-selected location; and
a U-bracket configured to:
  couple with the rotating shaft via the first alignment adjuster, wherein the U-bracket is rotatable by the rotating shaft for placing a camera mobile device holder in the plurality of rotation angles; and
  couple with the camera mobile device holder via the tilting shaft, wherein the camera mobile device holder is tiltable by the tilting shaft for placing the camera mobile device holder in the plurality of tilting angles.

5. The motorized camera mobile device stand of claim 4, the alignment component further comprising:
the camera mobile device holder comprising a first clamp and a second clamp that are configured to hold the camera mobile device in each of the plurality of positions,
wherein the first alignment adjuster is configured to:
  slide, with respect to the rotation axis, the U-bracket along the tilting axis; and
  hold the U-bracket in a first aligned position for the laser beam to substantially align with the camera lens, and
wherein the second alignment adjuster is configured to:
  unlock the second clamp to slide, with respect to the tilting axis, the camera mobile device along the rotation axis, and
  lock the second clamp to hold the camera mobile device in a second aligned position for the laser beam to substantially align with the camera lens.

6. The motorized camera mobile device stand of claim 2, the motorized component further configured to:
detect the camera mobile device in proximity to the motorized camera mobile device stand; and
initiate, in response to the detecting, the laser beam to align the camera lens,
wherein the command signal is received subsequent to the aligning the camera lens.

7. The motorized camera mobile device stand of claim 6, the motorized component further configured to:
  establish, in response to the detecting, a communication link with the camera mobile device; and
  use the communication link and in response to the rotating shaft reaching each of the plurality of rotation angles and the tilting shaft reaching each of the plurality of tilting angles, communicate with the camera mobile device to synchronize capturing the plurality of images and placing the camera mobile device in the plurality of positions.

8. A method for generating a panorama, comprising:
  substantially aligning, based on a laser beam of a motorized camera mobile device stand, a rotation axis of the motorized camera mobile device stand with a camera lens of a camera mobile device;
  substantially aligning, based on the laser beam, a tilting axis of the motorized camera mobile device stand with the camera lens;
  receiving, by the motorized camera mobile device stand, a command signal from the camera mobile device;
  placing, by the motorized camera mobile device stand in response to the command signal, the camera mobile device in a plurality of positions for capturing a plurality of images of the panorama; and
  constraining, by the motorized camera mobile device stand, the camera mobile device such that the camera lens substantially overlaps an intersection of the rotation axis and the tilting axis in each of the plurality of positions,
  wherein the plurality of positions comprise a plurality of rotation angles with respect to the rotation axis and a plurality of tilting angles with respect to the tilting axis, wherein the rotation axis intersects the tilting axis.

9. The method of claim 8, further comprising:
  activating, in response to the command signal, a rotating motor of the motorized camera mobile device stand to rotate a rotating shaft through the plurality of rotation angles, wherein the rotating shaft defines the rotation axis; and
  activating, in response to the command signal, a tilting motor of the motorized camera mobile device stand to rotate a tilting shaft through the plurality of tilting angles, wherein the tilting shaft defines the tilting axis.

10. The method of claim 9, further comprising:
  generating, by an alignment laser coupled to the rotating motor, the laser beam along the rotation axis and intersecting the tilting axis;
  receiving, based on the laser beam, a first activation of a first alignment adjuster to substantially align the rotation axis with the camera lens; and
  receiving, based on the laser beam, a second activation of a second alignment adjuster to substantially align the tilting axis with the camera lens.

11. The method of claim 10, further comprising:
  in response to the activating the rotating motor, rotating a U-bracket, coupled with the rotating shaft via the first alignment adjuster, with respect to the rotating shaft for placing a camera mobile device holder in the plurality of rotation angles; and
  in response to the activating the tilting motor, tilting the camera mobile device holder with respect to the tilting shaft for placing the camera mobile device holder in the plurality of tilting angles.

12. The method of claim 11, further comprising:
  receiving a third activation of the first alignment adjuster to:
    slide, with respect to the rotation axis, the U-bracket along the tilting axis; and
    hold the U-bracket in a first aligned position for the laser beam to substantially align with the camera lens; and
  receiving a fourth activation of the second alignment adjuster to:
    unlock a clamp of the camera mobile device holder to slide, with respect to the tilting axis, the camera mobile device along the rotation axis, and
    lock the clamp to hold the camera mobile device in a second aligned position for the laser beam to substantially align with the camera lens.

13. The method of claim 9, further comprising:
  detecting, by the motorized camera mobile device stand, the camera mobile device in proximity to the motorized camera mobile device stand; and
  initiating, in response to the detecting, the laser beam to align the camera lens.

14. The method of claim 13, further comprising:
  establishing, by the motorized camera mobile device stand and in response to the detecting, a communication link with the camera mobile device; and
  exchanging, using the communication link and in response to the rotating shaft reaching each of the plurality of rotation angles and the tilting shaft reaching each of the plurality of tilting angles, communication signals between the motorized camera mobile device stand and the camera mobile device to synchronize capturing the plurality of images and placing the camera mobile device in the plurality of positions.

15. A method for generating a panorama, comprising:
  sending, by a camera mobile device, a command signal to a motorized camera mobile device stand to place the camera mobile device in a plurality of positions, wherein the plurality of positions comprise a plurality of rotation angles with respect to a rotation axis of the motorized camera mobile device stand and a plurality of tilting angles with respect to a tilting axis of the motorized camera mobile device stand;
  capturing, using a camera lens of the camera mobile device at each of the plurality of positions, one of a plurality of images of the panorama; and
  exchanging, with the motorized camera mobile device stand by the camera mobile device at each of the plurality of positions, communication signals to synchronize the capturing the plurality of images and the placing the camera mobile device in the plurality of positions,
  wherein the command signal causes the motorized camera mobile device stand to constrain the camera mobile device such that the camera lens substantially overlaps, in each of the plurality of positions, an intersection of the rotation axis and the tilting axis.

16. The method of claim 15, further comprising:
  detecting, by the motorized camera mobile device stand, the camera mobile device in proximity to the motorized camera mobile device stand; and
  initiating, in response to the detecting, a laser beam of the motorized camera mobile device stand to
    substantially align the rotation axis with the camera lens; and
    substantially align the tilting axis with the camera lens.

17. The method of claim 15, further comprising:
  activating, in response to the command signal, a rotating motor of the motorized camera mobile device stand to rotate a rotating shaft through the plurality of rotation angles, wherein the rotating shaft defines the rotation axis; and activating, in response to the command signal, a tilting motor of the motorized camera mobile device stand to rotate a tilting shaft through the plurality of tilting angles, wherein the tilting shaft defines the tilting axis.

18. The method of claim 17, further comprising:
generating, by an alignment laser coupled to the rotating motor, the laser beam along the rotation axis and intersecting the tilting axis;
activating, based on the laser beam, a first alignment adjuster to substantially align the rotation axis with the camera lens; and
activating, based on the laser beam, a second alignment adjuster to substantially align the tilting axis with the camera lens.

19. The method of claim 18, further comprising:
in response to the activating the rotating motor, rotating a U-bracket, coupled with the rotating shaft via the first alignment adjuster, with respect to the rotating shaft for placing a camera mobile device holder in the plurality of rotation angles; and
in response to the activating the tilting motor, tilting the camera mobile device holder with respect to the tilting shaft for placing the camera mobile device holder in the plurality of tilting angles.

20. The method of claim 19, further comprising:
activating the first alignment adjuster to:
slide, with respect to the rotation axis, the U-bracket along the tilting axis; and
hold the U-bracket in a first aligned position for the laser beam to substantially align with the camera lens; and
activating the second alignment adjuster to:
unlock a clamp of the camera mobile device holder to slide, with respect to the tilting axis, the camera mobile device along the rotation axis, and
lock the clamp to hold the camera mobile device in a second aligned position for the laser beam to substantially align with the camera lens.

21. A non-transitory computer readable medium storing instructions for generating a panorama, the instructions, when executed by a computer processor, comprising functionality for:
substantially aligning, based on a laser beam of a motorized camera mobile device stand, a rotation axis of the motorized camera mobile device stand with a camera lens of a camera mobile device;
substantially aligning, based on the laser beam, a tilting axis of the motorized camera mobile device stand with the camera lens;
receiving, by the motorized camera mobile device stand, a command signal from the camera mobile device;
placing, by the motorized camera mobile device stand in response to the command signal, the camera mobile device in a plurality of positions for capturing a plurality of images of the panorama; and
constraining, by the motorized camera mobile device stand, the camera mobile device such that the camera lens substantially overlaps an intersection of the rotation axis and the tilting axis in each of the plurality of positions,
wherein the plurality of positions comprise a plurality of rotation angles with respect to the rotation axis and a plurality of tilting angles with respect to the tilting axis, wherein the rotation axis intersects the tilting axis.

22. The non-transitory computer readable medium of claim 21, the instructions, when executed by the computer processor, further comprising functionality for:
activating, in response to the command signal, a rotating motor of the motorized camera mobile device stand to rotate a rotating shaft through the plurality of rotation angles, wherein the rotating shaft defines the rotation axis; and
activating, in response to the command signal, a tilting motor of the motorized camera mobile device stand to rotate a tilting shaft through the plurality of tilting angles, wherein the tilting shaft defines the tilting axis.

23. The non-transitory computer readable medium of claim 22, the instructions, when executed by the computer processor, further comprising functionality for:
generating, by an alignment laser coupled to the rotating motor, the laser beam along the rotation axis and intersecting the tilting axis;
receiving, based on the laser beam, a first activation of a first alignment adjuster to substantially align the rotation axis with the camera lens; and
receiving, based on the laser beam, a second activation of a second alignment adjuster to substantially align the tilting axis with the camera lens.

24. The non-transitory computer readable medium of claim 23, the instructions, when executed by the computer processor, further comprising functionality for:
in response to the activating the rotating motor, rotating a U-bracket, coupled with the rotating shaft via the first alignment adjuster, with respect to the rotating shaft for placing a camera mobile device holder in the plurality of rotation angles; and
in response to the activating the tilting motor, tilting the camera mobile device holder with respect to the tilting shaft for placing the camera mobile device holder in the plurality of tilting angles.

25. The non-transitory computer readable medium of claim 24, the instructions, when executed by the computer processor, further comprising functionality for:
receiving a third activation of the first alignment adjuster to:
slide, with respect to the rotation axis, the U-bracket along the tilting axis; and
hold the U-bracket in a first aligned position for the laser beam to substantially align with the camera lens; and
receiving a fourth activation of the second alignment adjuster to:
unlock a clamp of the camera mobile device holder to slide, with respect to the tilting axis, the camera mobile device along the rotation axis, and
lock the clamp to hold the camera mobile device in a second aligned position for the laser beam to substantially align with the camera lens.

26. The non-transitory computer readable medium of claim 22, the instructions, when executed by the computer processor, further comprising functionality for:
detecting, by the motorized camera mobile device stand, the camera mobile device in proximity to the motorized camera mobile device stand; and
initiating, in response to the detecting, the laser beam to align the camera lens.

27. The non-transitory computer readable medium of claim 26, the instructions, when executed by the computer processor, further comprising functionality for:

establishing, by the motorized camera mobile device stand and in response to the detecting, a communication link with the camera mobile device; and exchanging, using the communication link and in response to the rotating shaft reaching each of the plurality of rotation angles and the tilting shaft reaching each of the plurality of tilting angles, communication signals between the motorized camera mobile device stand and the camera mobile device to synchronize capturing the plurality of images and placing the camera mobile device in the plurality of positions.

28. A non-transitory computer readable medium storing instructions for generating a panorama, the instructions, when executed by a computer processor, comprising functionality for:

sending, by a camera mobile device, a command signal to a motorized camera mobile device stand to place the camera mobile device in a plurality of positions, wherein the plurality of positions comprise a plurality of rotation angles with respect to a rotation axis of the motorized camera mobile device stand and a plurality of tilting angles with respect to a tilting axis of the motorized camera mobile device stand;

capturing, using a camera lens of the camera mobile device at each of the plurality of positions, one of a plurality of images of the panorama; and exchanging, with the motorized camera mobile device stand by the camera mobile device at each of the plurality of positions, communication signals to synchronize the capturing the plurality of images and the placing the camera mobile device in the plurality of positions, wherein the command signal causes the motorized camera mobile device stand to constrain the camera mobile device such that the camera lens substantially overlaps, in each of the plurality of positions, an intersection of the rotation axis and the tilting axis.

29. The non-transitory computer readable medium of claim 28, the instructions, when executed by the computer processor, further comprising functionality for:

detecting, by the motorized camera mobile device stand, the camera mobile device in proximity to the motorized camera mobile device stand; and initiating, in response to the detecting, a laser beam of the motorized camera mobile device stand to
substantially align the rotation axis with the camera lens; and
substantially align the tilting axis with the camera lens.

30. The non-transitory computer readable medium of claim 28, the instructions, when executed by the computer processor, further comprising functionality for:

activating, in response to the command signal, a rotating motor of the motorized camera mobile device stand to rotate a rotating shaft through the plurality of rotation angles, wherein the rotating shaft defines the rotation axis; and activating, in response to the command signal, a tilting motor of the motorized camera mobile device stand to rotate a tilting shaft through the plurality of tilting angles, wherein the tilting shaft defines the tilting axis.

31. The non-transitory computer readable medium of claim 30, the instructions, when executed by the computer processor, further comprising functionality for:

generating, by an alignment laser coupled to the rotating motor, the laser beam along the rotation axis and intersecting the tilting axis;

activating, based on the laser beam, a first alignment adjuster to substantially align the rotation axis with the camera lens; and activating, based on the laser beam, a second alignment adjuster to substantially align the tilting axis with the camera lens.

32. The non-transitory computer readable medium of claim 31, the instructions, when executed by the computer processor, further comprising functionality for:

in response to the activating the rotating motor, rotating a U-bracket, coupled with the rotating shaft via the first alignment adjuster, with respect to the rotating shaft for placing a camera mobile device holder in the plurality of rotation angles; and in response to the activating the tilting motor, tilting the camera mobile device holder with respect to the tilting shaft for placing the camera mobile device holder in the plurality of tilting angles.

33. The non-transitory computer readable medium of claim 32, the instructions, when executed by the computer processor, further comprising functionality for:

activating the first alignment adjuster to:
slide, with respect to the rotation axis, the U-bracket along the tilting axis; and
hold the U-bracket in a first aligned position for the laser beam to substantially align with the camera lens; and activating the second alignment adjuster to:
unlock a clamp of the camera mobile device holder to slide, with respect to the tilting axis, the camera mobile device along the rotation axis, and
lock the clamp to hold the camera mobile device in a second aligned position for the laser beam to substantially align with the camera lens.

* * * * *